United States Patent [19]
Lung et al.

[11] Patent Number: 5,888,014
[45] Date of Patent: Mar. 30, 1999

[54] EXTENSIBLE LOCKABLE APPARATUS

[76] Inventors: Jimmy R. Lung, 109 Calhoun Ave.;
Wayne E. Lung, 124 Calhoun Ave.,
both of Destin, Fla. 32541

[21] Appl. No.: 837,088

[22] Filed: Apr. 14, 1997

[51] Int. Cl.$^6$ ....................................................... F16B 7/10
[52] U.S. Cl. ........................ 403/109.1; 403/377; 403/325; 248/410
[58] Field of Search ..................................... 403/109, 110, 403/104, 376, 377, 325, 321, 322; 248/410, 336, 333

[56] References Cited

U.S. PATENT DOCUMENTS

| | | | |
|---|---|---|---|
| 1,372,456 | 7/1921 | Roetter | 248/410 |
| 2,442,779 | 11/1948 | Oriold | 248/410 |
| 2,495,674 | 1/1950 | Lewis | 248/410 |
| 3,588,023 | 6/1971 | Cohen | 248/410 |
| 5,547,308 | 8/1996 | Wright | 403/325 |

FOREIGN PATENT DOCUMENTS

| 1913499 | 1/1970 | Germany | 248/410 |
|---|---|---|---|

*Primary Examiner*—Anthony Knight
*Assistant Examiner*—John R. Cottingham
*Attorney, Agent, or Firm*—Arthur G. Yeager

[57] ABSTRACT

An apparatus for locking a telescopic column in any selected extended length and for unlocking a skewed lock washer so that the column can return it to a collapsed position particularly by the use of a foot pedal to unlock same; and the use of such an apparatus in a rapidly adjustable supporting platform for displaying an article thereon. The apparatus preferably includes a movable base supporting the column.

20 Claims, 1 Drawing Sheet

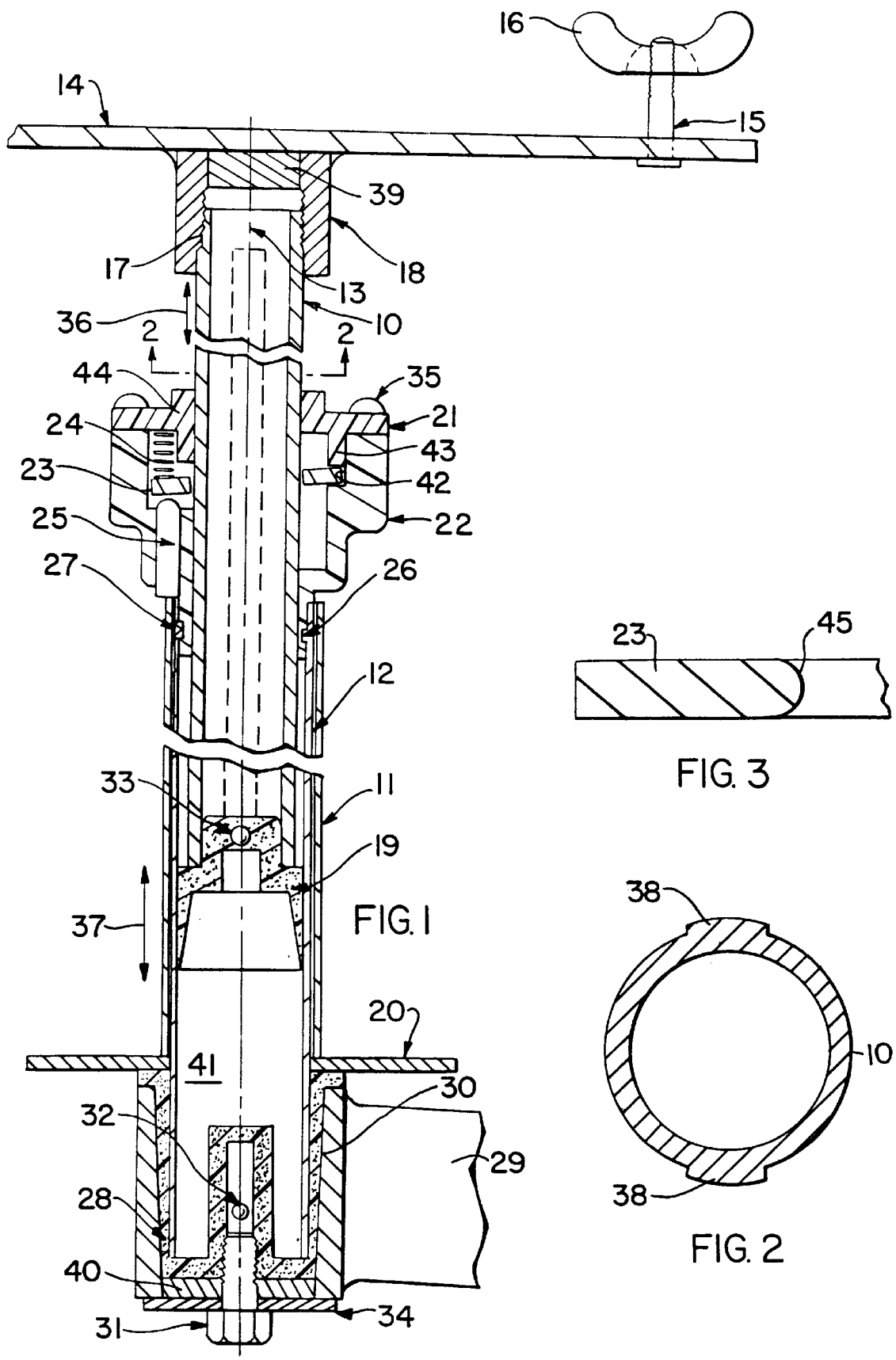

EXTENSIBLE LOCKABLE APPARATUS

TECHNICAL FIELD

This invention relates to an extensible lockable apparatus, including a prop stand having a telescopic supporting column that is rapidly adjustable to any selected length and instantly locked in that extended position; and more particularly to an apparatus that can be rapidly locked and/or unlocked into and from an extended position.

BACKGROUND OF THE INVENTION

There are many types of apparatus, e.g., tables, chairs, etc. that are adjustable in height. This is particularly important and useful in the dramatic arts where various "props" are employed to make a scene on a stage resemble an actual location. These props normally need to be adjustable in height to fit properly into a scene with other props and with actors and actresses. In order to save time a particular prop may be height-adjustable so as to be used in different scenes. In many instances every detail of a prop need not be apparent, it being necessary only to convey the idea that a particular prop represents an actual article, e.g., a table, a chair, a desk, etc. In such instances a prop stand is convenient because it is easily movable to a desired location, and it can be covered or decorated to look like the actual article it represents. Such props are often used in a stage drama, or at a scene where moving pictures are taken or a TV camera is photographing a scene. There may, of course, be other uses for a telescopic column which can be lengthened to a desired amount and be automatically locked at that extension until unlocked. Other prior art mechanisms have required set screw arrangement to lock an extended telescopic mechanism, and similarly releasing the set screw in order to unlock the extended mechanisms. In the present invention no set screw is needed; one merely needs to extend the telescopic piece and it catches and locks in the first minute amount of release movement, although the unlocking can be accomplished by a foot pedal pressure or the like.

It is an object of the present invention to provide a locking mechanism that automatically is activated when a telescoping shaft is extended through a housing containing the locking mechanism and instantly is locked against any reverse motion; and that reverse motion is permitted when the mechanism is unlocked by pressure against a foot pedal. It is another object of the invention to provide a stand for holding a prop used in a dramatic scene, in which the prop stand is extendible in height, automatically locked, and can be unlocked by the touch of a foot on a pedal. Other objects can be understood upon reading and understanding the more detailed description of the invention which follows.

SUMMARY OF THE INVENTION

This invention relates to an apparatus for locking a telescopic column at a selected length and subsequently unlocking the column to be adjusted to a different length including a vertical column having two coaxial shafts, an inner of the shafts being longitudinally movable and a central stationary shaft. The inner shaft has upper and lower end portions, and means for attaching an article to the upper end portion of the inner shaft. A gasket means is attached to the lower end portion of the inner shaft and lock means for locking and unlocking the inner shaft disposed generally medially of the inner shaft. The lock means includes a locking collar housing containing a lock washer encircling the inner shaft and positioned in a partially circumferential groove in the housing to permit the washer to move from a position perpendicular to a longitudinal axis of the column to a position askew to prevent any downward axial movement of the inner shaft. The lock means also includes a spring biasing the washer downwardly to a skewed position and pin means slidably in the housing for contacting the washer and moving it counter to the bias of the spring. An activator means is disposed loosely surrounding the central shaft and adapted to be selectively forced longitudinally upwardly to cause the pin means to move upwardly to unlock the lock washer and permit adjustment upwardly and downwardly of the inner shaft.

Other features are seen wherein the activator means includes an outer shaft having opposite ends and being disposed outwardly of the inner and central shafts and foot pedal means supporting one of the ends of the outer shaft, the pin means being engaged with another of the ends of the outer shaft. One of the ridges has spaced elongated side edges and is disposed closely adjacent the spring. Another unlocking pin is adapted to contact the washer and move it counter to the urging of the spring, and the unlocking pins are disposed generally adjacent respective side edges of the one ridge.

In specific embodiments of the invention the inner shaft has two diametrically opposed lengthwise ridges against which the locking washer wedges itself into performing the locking action. In another embodiment the mechanism is mounted on a wheeled base for easy movement to any desired location. In still another specific embodiment the extendible shaft has a bell-shaped flexible gasket at its lower extremity which gasket touches against the inside surface of the stationary hollow shaft preventing any sudden downward movement of the extendible shaft when released from its locked position.

BRIEF DESCRIPTION OF THE DRAWINGS

The novel features believed to be characteristic of this invention are set forth with particularity in the appended claims. The invention itself however both as to its organization and method of operation, together with further objects and advantages thereof, may best be understood by reference to the following the following description taken in connection with the accompanying drawings in which:

FIG. 1 is a longitudinal cross-sectional view of the apparatus of this invention mounted on a movable support and having a table top on which to mount an article for display;

FIG. 2 is a cross sectional view of the inner shaft taken at 2—2 of FIG. 1; and

FIG. 3 is an enlarged cross-section of the lock washer showing an internal rounded edge to minimize damage to the shaft contacted by the lack washer.

DETAILED DESCRIPTION OF THE INVENTION

This invention may best be understood by reference to the attached drawings as they relate to the more detailed description which follows.

FIG. 1 shows a columnar mechanism resting in a central socket 30 of wheeled base 29 similar to that used to support a swivel chair in a business office. The top of the columnar mechanism is a flat plate 14 to which any article may be clamped; for example, by means of bolt 15 and wing nut 16; for display purposes. Such display supports are commonly used in dramatic productions, e.g., stage plays, television presentations, etc., where it is important to speedily set up props and speedily remove them for the next scene. Generally there must be some means to raise or lower the elevation of plate 14 along axis 13 so that the article displayed thereon can be rapidly positioned to suit the requirements of the stage manager or the television set director. It is for this purpose that the present invention is admirably suited.

The main portion of the structure of this apparatus is a telescopic central column of three concentric shafts: inner shaft 10, outer shaft 11 and central shaft 12 which combine to form the operating connection between base 29 and platform 14 mounted via shaft threads 17 and welded pipe nut 18 around locator plug 39. Central shaft 12 is preferably hollow throughout its length and forms a rigid stationary support seated in adaptor sleeve 28 which, in turn, rests in socket 30 of support base 29 and a pin 32 connects shaft 12 to socket 30. The upper end of central shaft is rigidly connected to the lower end of housing 22 which contains the locking and unlocking mechanisms that are more fully described below. Outside of central shaft 12 is a means in the form of an outer shaft 11 which is movable in the directions of double arrow 37 to unlock the mechanism in housing 22. Outer shaft 11 is moved upwardly by downward foot pressure of a human operator on the outer edge of disc 20 causing shaft 11 to move upwardly pressing unlocking pin 25 upward against lock washer 23 to unlock it from a skewed wedging position that locks washer 23 between housing 22 and inner shaft 10 preventing any downward movement of shaft 10. Shaft 10 moves upwardly and downwardly in the directions of double arrow 36. The upward motion is done by a human pulling platform 14 upward to a desired position. The downward motion may be accomplished by a human pushing downward on platform 14 or it may occur by gravity working on the weight resting on platform 14. At the lower end of shaft 10 there is affixed via a pin 33 a bell gasket 19 having its lower outer rim touching the inside surface of shaft 10. Any attempt at rapid downward movement of shaft 10 causes the air in space 41 to become pressurized expanding the outer rim of gasket 19 to press more tightly against the inner surface of shaft 10. Shaft 10 will move slowly downwardly by allowing the slow escape of air around bell gasket 19. If this is too slow, an adjustable needle valve may be inserted through the lower wall of socket 30 to adjust the speed of descent of shaft 10 to a desired level.

Housing 22 and its cover 21 secured via bolts 35 are preferably made from a molded plastic material, e.g., polyolefin, polyamide, polycarbonate, polyaldehyde, polyester or mixtures or copolymers thereof, which can function noiselessly and generally without lubrication in the functioning of lock washer 23, spring 24, and pin 25. The lower neck of housing 22 fits inside of stationary central shaft 12 and is affixed thereto by any convenient means, e.g., screwthreads, glue, pins, etc. In the instance shown in FIG. 1, an inwardly projecting crimp 27 in the wall of shaft 12 is pressed into a groove 26 around the outside of the neck of housing 22. Pin 25 slides axially in a suitable vertical passageway molded in housing 22. Spring 24 rests in a seat molded in housing 22 with the lower end of spring 24 biased against the upper surface of lock washer 23, generally opposing, and in alignment with, unlocking pin 25. The remaining features of the inside of housing 22 are those designed to hold lock washer 23 in a pivotable position while the diametrically opposite edge of the lock washer 23 can be moved up and down between spring 24 and pin 25 from a position locking shaft 10 to a position unlocking shaft 10. Groove 42 is formed by a partially circumferential ledge in housing 22 cooperating with a similar ridge or tongue on cover 21. Groove 42 is loose fitting around washer 23 so as to permit pivoting of washer 23 and yet tight enough radially so as to retain washer 23 in groove 42 throughout its pivoting movements. Cover 21 may also be fashioned with a stop ridge 44 having ridge 43 positioned near spring 24 and pin 25 to prevent washer 23 from moving too far upwardly. The precise inside designs of cover 21 and housing 22 are not fixed nor are they precise in any way other than to serve the purpose of maintaining lock washer 23 in position to be skewed against inside shaft 10 (actually skewed against wear ledges 38 of shaft 10 as described with respect to FIG. 2) when shaft 10 is locked and to be easily unlocked by pin 25 and yet remain in position to be locked again.

A filler plug 40 is located below the socket 30 in the base of arm 29, and a washer 34 engages the arm 29 and a central bolt 31 is threadedly connected to socket 30 thereby fixing the end of central shaft 12 firmly to the arm 29 via pin 32 and socket 30.

FIG. 2 shows a preferred shape of shaft 10 in cross-section. It is, of course, not necessary to the smooth working of this invention that shaft 10 be of any particular cross-section, except that shaft 10 must move axially up and down in the directions of double arrow 36. A smooth circular outer surface of shaft 10 is eminently workable. It is, however, a characteristic of the apparatus of this invention that the outer surface of shaft 10, where it is contacted by lock washer 23 will eventually become marred, as will the inner edges of lock washer 23, over long periods of use. If the damage to shaft 10 or washer 23 is great enough, the damaged piece must be replaced. While a prudent choice of materials of shaft 10 and washer 23 will confine the wear to the softer material, this may not be sufficiently economic. One solution to this problem is shown in FIG. 2 where shaft 10 is made with two opposed ledges 38 of larger diameter than the remainder of shaft 10. This modified shaft is then positioned so that the wedging contact between shaft 10 and washer 23 occurs at a ledge 38. Generally, the opposite side of shaft 10 resting in groove 42 does not receive any gross wear and tear. Thus, the shaft of FIG. 2 may be turned 180 degrees after a period of wear on one ledge 38 to expose the other ledge 38 to a similar period of wear. Still another modification to reduce the damage caused by washer 23 being jammed in a skewed angle with shaft 10 is to fashion the inside surface of washer 23 to be less damaging. This can be accomplished by removing the sharp right-angle corners on washer 23 and replacing them with a rounded inside surface 45 on washer 23 as shown in FIG. 3. Still other expedients may be employed without departing from the general features of this invention. It is to be understood that washer 23 is readily and assuredly unlocked by depressing foot pedal 20, preferably a pair of spaced pins 25 are located on opposite sides of a ridge 38 and disposed generally vertically aligned with the spring 24.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An apparatus for locking a telescopic column at a selected length and subsequently unlocking the column to be adjusted to a different length; said apparatus comprising a vertical column of three coaxial shafts: an inner shaft and an outer shaft being longitudinally movable independent of each other and a central stationary shaft; said inner shaft having affixed to the upper end thereof a means for attaching an article thereto, at the lower end thereof; a gasket to prevent speedy downward movement of said inner shaft, and at a central location between said upper and lower ends a locking collar housing containing a lock washer encircling said inner shaft and positioned in a partially circumferential groove in said housing to permit said washer to move from a position perpendicular to the longitudinal axis of said column to a position sufficiently askew to prevent any downward axial movement of said inner shaft; said housing including a spring urging said washer to a downwardly skewed position and an unlocking pin adapted to contact said washer and move it counter to the urging of said spring; said outer shaft extending from an upper contact with said unlocking pin to a lower contact with th activator disc loosely surrounding said central shaft and adapted to be pressed by an operator's foot to cause said outer shaft to move longitudinally upwardly to cause said locking pin to move upwardly to unlock said lock washer, said inner shaft having an outer primary cylindrical surface with two diametrically opposed narrow ridges of a secondary cylindrical surface slightly larger in diameter than that of the primary surface.

2. The apparatus of claim 1 wherein one of said ridges having spaced elongated side edges and disposed closely adjacent said spring, another unlocking pin adapted to contact said washer and move it counter to the urging of said spring, said unlocking pins being disposed generally adjacent respective said side edges of said one ridge.

3. The apparatus of claim 1 wherein said lock washer and said collar housing are adapted to position said lock washer to be skewed against said opposed narrow ridges of said inner shaft.

4. The apparatus of claim 1 wherein said inner shaft is extensible with respect to said central stationary shaft which is affixed to a supporting base at its lower end and supports said housing at its upper end, said outer shaft having limited movement for moving said pin to cause said washer to unlock from said inner shaft.

5. The apparatus of claim 1 wherein said means for attaching includes a horizontal support plate rigidly attached to the upper end of said inner shaft, and a support frame for said apparatus adapted to be located on a generally horizontal surface.

6. The apparatus of claim 1 wherein said locking collar housing comprises a hollow bell-shaped body with a wide mouth facing upwardly and a narrow bottom portion fastened tightly to said inner shaft, and a disc-shaped cover bolted to said body and having a central bore having substantially the same size and shape as the transverse cross-section of the outer surface of said inner shaft.

7. The apparatus of claim 1 wherein said lock washer is a flat disc having a circular outside diameter adapted to fit into said partially circumferential groove and a circular inside diameter slightly larger than the diameter of said secondary cylindrical surface.

8. The apparatus of claim 1 wherein said gasket at the lower end of said inside shaft is a semi-flexible plastic material having the shape of a bell with an upper closed end and a lower open end, said upper closed end being fastened snugly to the inside diameter of said inside shaft at the lower end thereof and said lower open end being tapered to a knife edge which touches around the perimeter of said edge the inside surface of said central shaft.

9. The apparatus of claim 1 which is seated vertically in a central socket of a radially spoked base adapted to be moved across a horizontal floor, said socket including a plastic cap-sleeve resting at the bottom inside of said socket and serving as a seat for the bottom of said central shaft.

10. An apparatus for locking a telescopic column at a selected length and subsequently unlocking the column to be adjusted to a different length comprising a vertical column including two coaxial shafts, an inner of said shafts being longitudinally movable and a central stationary of said shafts being stationary, said inner shaft having upper and lower end portions, means for attaching an article to said upper end portion of said inner shaft, gasket means attached to said lower end portion of said inner shaft for preventing speedy downward movement of said inner shaft and lock means for locking and unlocking said inner shaft disposed generally medially of said inner shaft, said lock means including a locking collar housing containing a lock washer encircling said inner shaft and positioned in a partially circumferential groove in said housing to permit said washer to move from a position perpendicular to a longitudinal axis of said column to a position askew to prevent any downward axial movement of said inner shaft; said lock means including a spring biasing said washer downwardly to a skewed position, said lock means including pin means slidably in said housing for contacting said washer and moving it counter to the bias of said spring; an activator means loosely surrounding said central shaft and adapted to be selectively forced longitudinally upwardly to cause said pin means to move upwardly to unlock said lock washer and permit adjustment upwardly and downwardly of said inner shaft, said inner shaft having an outer primary cylindrical surface with two diametrically opposed narrow ridges of a secondary cylindrical surface slightly larger in diameter than that of the primary surface, said housing having a cover with generally complemental slots therein for slidably receiving respective said narrow ridges.

11. The apparatus of claim 10 wherein said lock washer in said collar housing is biased and skewed against said opposed narrow ridges of said inner shaft.

12. The apparatus of claim 10 wherein said lock washer is a flat disc having a circular outside diameter adapted to fit into said partially circumferential groove and a circular inside diameter slightly larger than the diameter of said secondary cylindrical surface.

13. The apparatus of claim 10 wherein one of said ridges having spaced elongated side edges and disposed closely adjacent said spring, another unlocking pin adapted to contact said washer and move it counter to the urging of said spring, said unlocking pins being disposed generally adjacent respective said side edges of said one ridge.

14. The apparatus of claim 10 wherein said activator means includes an outer shaft having opposite ends and being disposed outwardly of said inner and central shafts and foot pedal means supporting one of said ends of said outer shaft, said pin means being engaged with another of said ends of said outer shaft.

15. The apparatus of claim 14 wherein said central shaft is hollow throughout its length, said gasket means at said lower end portion of said inside shaft being a semi-flexible plastic material having the shape of a bell with an upper closed end and a lower open end, said inner shaft having a cavity in said lower end portion thereof, said upper closed end being fastened to said inner shaft lower end portion with said upper closed end being disposed in said cavity, said lower open end of said bell being tapered to a thin edge which engages around the perimeter of said edge an inside surface forming said hollow of said central shaft.

16. The apparatus of claim 10 further comprising a support frame mounted to said central shaft, said means for attaching an article includes a horizontal support plate rigidly attached to said upper end portion of said inner shaft.

17. The apparatus of claim 10 wherein said locking collar housing a hollow bell-shaped body with a wide mouth facing upwardly and a narrow bottom portion fastened tightly to said inner shaft, and a disc-shaped cover bolted to said body and having a central bore of substantially the same size and shape as a transverse cross-section of an outer surface of said inner shaft.

18. The apparatus of claim 10 further comprising a base having a central socket, said socket including a plastic cap-sleeve therein, said central shaft having a lower end portion disposed in said cap-sleeve and being attached to said socket.

19. An apparatus for locking a telescopic column at a selected length and subsequently unlocking the column to be adjusted to a different length comprising a vertical column including two coaxial shafts, an inner of said shafts being longitudinally movable and a central of said shafts being stationary, said inner shaft having upper and lower end portions, means for attaching an article to said upper end portion of said inner shaft, and lock means for locking and unlocking said inner shaft disposed generally medially of said inner shaft, said lock means including a locking collar housing containing a lock washer encircling said inner shaft and positioned in a partially circumferential groove in said housing to permit said washer to move from a first position perpendicular to a longitudinal axis of said column to a second position askew to prevent any downward axial movement of said inner shaft; said lock means including a spring biasing said washer downwardly to said second position, said lock means including pin means slidably in said housing for contacting said washer and moving it counter to the bias of said spring; an activator housing surrounding said central shaft and adapted to be selectively forced longitudinally upwardly to cause said pin means to move upwardly to said first position unlock said lock washer and permit adjustment upwardly and downwardly of said inner shaft, a circular plate engageable by a foot of a user and disposed about said housing and tiltably movable to unlock said lock washer.

20. The apparatus of claim 19 wherein said inner shaft has an outer primary cylindrical surface with two diametrically opposed narrow ridges of a secondary cylindrical surface slightly larger in diameter than that of the primary surface.

* * * * *